(12) United States Patent
Ding

(10) Patent No.: US 10,251,514 B2
(45) Date of Patent: Apr. 9, 2019

(54) GRINDER

(75) Inventor: Lv Ding, Ningbo (CN)

(73) Assignee: NINGBO CHEFSHERE KITCHEN TECHNOLOGY CO., LTD., Ningbo (CN)

( * ) Notice: Subject to any disclaimer, the term of this patent is extended or adjusted under 35 U.S.C. 154(b) by 1380 days.

(21) Appl. No.: 14/355,511

(22) PCT Filed: Mar. 5, 2012

(86) PCT No.: PCT/CN2012/000270
§ 371 (c)(1),
(2), (4) Date: Apr. 30, 2014

(87) PCT Pub. No.: WO2013/063855
PCT Pub. Date: May 10, 2013

(65) Prior Publication Data
US 2014/0252149 A1    Sep. 11, 2014

(30) Foreign Application Priority Data

Nov. 1, 2011    (CN) .......................... 2011 1 0339395

(51) Int. Cl.
*A47J 42/24*    (2006.01)
*A47J 42/50*    (2006.01)
*A47J 42/38*    (2006.01)

(52) U.S. Cl.
CPC .............. *A47J 42/24* (2013.01); *A47J 42/38* (2013.01); *A47J 42/50* (2013.01)

(58) Field of Classification Search
CPC .............. A47J 42/24; A47J 42/38; A47J 42/50
(Continued)

(56) References Cited

U.S. PATENT DOCUMENTS

| 2,001,075 A | * | 5/1935 | Sundrand .............. A47J 42/24 241/100 |
| 2,074,795 A | * | 3/1937 | Mantelet ................. A47J 42/34 222/408.5 |

(Continued)

FOREIGN PATENT DOCUMENTS

| CN | 2840885 Y | 11/2006 |
| CN | 101721147 A | 6/2010 |

(Continued)

OTHER PUBLICATIONS

International Search Report/Written Opinion, PCT/CN2012/000270, ISA/CN, dated Aug. 2, 2012, pp. 1-9.

*Primary Examiner* — Sean Michalski
(74) *Attorney, Agent, or Firm* — Thomas Coester Intellectual Property

(57) ABSTRACT

The present invention relates to a grinder, comprising a container bottle for containing a spice, a grinding assembly interconnected with the container bottle and used for grinding the spice and a casing for accommodating the grinding assembly. A feeding mechanism for pushing the spice in the container bottle into the grinding assembly is further provided between the container bottle and the grinding assembly in the casing. Compared with the prior art, the design of the feeding mechanism in the present invention provides a solution for feeding of a spice with large volume and/or a relatively smooth spice with small friction in the prior art, so that the grinder provided by the present invention is applicable to not only grinding of a granular spice, but also grinding of a leafy spice with large volume and light weight.

8 Claims, 3 Drawing Sheets

(58) Field of Classification Search
USPC .................................................. 241/168
See application file for complete search history.

(56) References Cited

U.S. PATENT DOCUMENTS

| | | | | | |
|---|---|---|---|---|---|
| 2,094,548 | A | * | 9/1937 | Meeker | A47J 42/16 241/100 |
| 2,118,010 | A | * | 5/1938 | Hazle, Jr. | A47J 42/38 241/13 |
| 2,121,453 | A | * | 6/1938 | Sundstrand | A47J 42/24 241/167 |
| 2,125,629 | A | * | 8/1938 | Gallo | A47G 19/24 222/459 |
| 2,876,956 | A | * | 3/1959 | Bentley | A47J 42/34 241/168 |
| 2,974,887 | A | * | 3/1961 | Grandinetti | A47J 42/04 241/101.2 |
| 3,371,874 | A | * | 3/1968 | Reeves | A47J 42/04 241/169.1 |
| 3,666,187 | A | * | 5/1972 | Norris | B01F 15/00006 241/46.01 |
| 3,734,417 | A | * | 5/1973 | Russell | A47J 42/06 241/168 |
| 3,827,641 | A | * | 8/1974 | Andersson | A47J 42/04 241/101.01 |
| 3,991,947 | A | * | 11/1976 | Schlessel | A47J 42/04 241/169.1 |
| 4,026,490 | A | * | 5/1977 | Johansson | A47J 42/04 241/169.1 |
| 4,037,801 | A | * | 7/1977 | Jimenez | B02C 7/11 198/608 |
| 4,588,136 | A | * | 5/1986 | Homma | A23G 9/045 241/168 |
| 4,878,625 | A | * | 11/1989 | Newnan | A47J 42/18 241/259.1 |
| 4,960,246 | A | * | 10/1990 | Fohrman | A47J 42/04 241/169.1 |
| 5,022,591 | A | * | 6/1991 | Sanders | A47J 42/06 241/169.1 |
| 5,145,119 | A | * | 9/1992 | Lowe | A47G 19/24 222/142.4 |
| 5,176,329 | A | * | 1/1993 | De Coster | A47J 42/04 241/169.1 |
| 5,180,114 | A | * | 1/1993 | Chen | A47J 42/04 241/169.1 |
| 5,193,752 | A | * | 3/1993 | Yukimi | B02C 17/00 241/21 |
| 5,531,389 | A | * | 7/1996 | Husted | A47J 42/04 241/169.1 |
| 5,716,057 | A | * | 2/1998 | Wright, Jr. | B23B 31/1238 279/123 |
| 5,785,264 | A | * | 7/1998 | Yang | A47J 42/38 241/169.1 |
| 5,899,248 | A | * | 5/1999 | Anderson | A47K 5/10 141/358 |
| 6,056,217 | A | * | 5/2000 | Friden | A47J 42/06 241/135 |
| 6,164,574 | A | * | 12/2000 | Weibel | A47J 42/18 241/168 |
| 6,181,104 | B1 | * | 1/2001 | Rhoads | A47J 42/26 320/107 |
| 6,508,424 | B1 | * | 1/2003 | Marshall | A61J 7/0007 241/169.1 |
| 6,616,075 | B1 | * | 9/2003 | Millerd | A47J 42/34 241/168 |
| 6,663,031 | B2 | * | 12/2003 | Henderson | A47J 42/50 241/169.1 |
| 6,830,206 | B2 | * | 12/2004 | Yang | A47J 42/46 241/168 |
| 7,040,561 | B2 | * | 5/2006 | Wong | A47J 42/04 222/229 |
| 7,077,347 | B1 | * | 7/2006 | Wang | A47J 42/34 241/168 |
| 7,204,440 | B2 | * | 4/2007 | Fouse | A47J 42/34 241/168 |
| 7,207,509 | B2 | * | 4/2007 | Mazza | A47J 43/255 241/169.1 |
| 7,222,806 | B2 | * | 5/2007 | Fornage | A47J 42/04 241/168 |
| 7,328,865 | B1 | * | 2/2008 | Mills | A47J 42/40 241/168 |
| 7,543,771 | B2 | * | 6/2009 | Wang Wu | A47J 42/04 241/168 |
| 7,793,874 | B2 | * | 9/2010 | Pai | A47J 42/40 241/101.2 |
| 7,878,437 | B2 | * | 2/2011 | Rice | A47J 42/08 241/189.1 |
| 7,967,229 | B2 | * | 6/2011 | Wilson | A47J 42/08 241/169.1 |
| 7,988,081 | B2 | * | 8/2011 | Robbins | A47J 42/08 241/101.2 |
| 8,074,915 | B2 | * | 12/2011 | Wheaton | A47J 42/00 241/168 |
| 8,393,563 | B2 | * | 3/2013 | Chaoui | B02C 18/08 241/168 |
| 8,534,579 | B2 | * | 9/2013 | Carapelli | A47J 42/08 241/168 |
| 8,622,329 | B1 | * | 1/2014 | Jones | A47J 42/38 241/169.1 |
| 9,737,172 | B2 | * | 8/2017 | Krus | A47J 42/46 |
| 9,763,541 | B2 | * | 9/2017 | Krus | A47J 42/08 |
| 2002/0117567 | A1 | * | 8/2002 | Lee | A47J 42/04 241/169.1 |
| 2004/0182958 | A1 | * | 9/2004 | Herren | A47J 42/08 241/169.1 |
| 2005/0211806 | A1 | * | 9/2005 | Ng | A47J 42/06 241/169.1 |
| 2007/0158480 | A1 | * | 7/2007 | Yao | A47J 42/50 241/169.1 |

FOREIGN PATENT DOCUMENTS

DE 29999353 U1 5/2000
KR 1020070087409 A 8/2007

\* cited by examiner

GRINDER

CROSS-REFERENCE TO RELATED APPLICATIONS

This application is US national phase entry under 35 U.S.C. § 371 of PCT/CN2012/000270, filed Mar. 5, 2012, which claims priority to Chinese patent application Serial No. 201110339395.4, filed Nov. 1, 2011, all incorporated by reference herein.

TECHNICAL FIELD OF THE INVENTION

The present invention relates to a grinder.

BACKGROUND OF THE INVENTION

When cooking, people like to use spices which can emanate certain flavors to change the flavors of food. However, spices in their original state are usually in large volume, or leafy, or in large granular structures or other irregular shapes. Spices are usually ground into powder or small grains to be used instead of being added with their original structures. This is because spices in powder or small granular can emanate richer flavors with fewer amounts compared with those in their original structures. At the same time, these powdery or small granular spices can be dissolved in foods uniformly after being added, thus preventing strong tastes caused by spices in their original structures for those who eat these foods. Therefore, ground spices are preferred by people.

Generally, there are two spice grinding methods, industrial grinding and home grinding. Industrial grinding refers to grinding a spice into an ideal state with machines, and then the spice is packed and sold. Since powdery and small granular spices are easy to lose their flavor, the ground spices have a certain shelf life which is much shorter than the shelf lives of those in their original structures. Home grinding refers to grinding spices with some relatively small convenient handheld small-size grinders. The amount of each grinding is basically the use amount required for each cooking. Flavors provided by freshly-ground spices are more natural, original and purer. As people are requiring higher and higher quality of life, home grinders become more and more popular.

Existing grinders usually comprise a container portion for containing raw spices and a grinding head assembly interconnected with the container portion and for grinding the spices. The grinding head assembly comprises an auxiliary grinding head with a through hole and a main grinding head configured in the through hole. Grinding teeth are configured on the opposite peripheral walls of the main grinding head and the auxiliary grinding head and there is a certain distance there between to form a grinding cavity of the spices. Since the grinding cavity is relatively narrow, generally, existing home grinders can only be used for grinding zanthoxylum and coarse salt grains etc. with relatively small original structures. Spices that can be ground need to be able to slide/drop from the container portion into the grinding cavity by their own weight. Some spices with relatively light weight and/or relatively large original volume, such as chilies, bay leaves and star anise etc., cannot be ground.

SUMMARY OF THE INVENTION

The technical problem to be solved by the present invention is to provide a grinder capable of conveniently grinding not only spices with small volume and high density, but also spices with large volume and low density according to the present situation of the prior art.

The technical solution applied by the present invention to solve the technical problem above is: the grinder, comprising a container bottle for containing spices, a grinding assembly interconnected with the container bottle for grinding the spices and a casing for accommodating the grinding assembly, wherein a feeding mechanism to push the spices in the container bottle into the grinding assembly is further provided between the container bottle and the grinding assembly in the casing.

The feeding mechanism may have various types, e.g. a lever mechanism.

Preferably, the feeding mechanism may be a screw rod provided between the container bottle and the grinding assembly and driven by external force to rotate, and the feeding screw rod is also called a packing auger.

In order to increase the friction of the spice between the screw rod and the inner wall of the casing so that the spice can be conveyed more smoothly, a plurality of bumps protruding towards the screw rod may be provided on the inner peripheral walls of the casing facing the screw rod to increase the friction between the spices and the inner wall of the casing when the screw rod feeds the spices more smoothly.

Preferably, the bumps are shaped as strips and arranged parallel to the axial axis of the screw rod.

The grinding assembly in each solution above may use various structures in the prior art. Preferably, the grinding assembly may comprise a fixed blade configured in the casing, a moveable blade matched with the fixed blade to cut and grind the spices and driven by external force to rotate. The structure is especially applicable to grinding leafy spices with large volume or surface area.

As an improvement, the moveable blade may comprise a fixed base driven by external force to rotate and a plurality of blades connected to the periphery of the fixed base. The blades are arranged uniformly along the periphery of the fixed base. The moveable blade structure also functions as a stirring paddle so that the spices are fed more smoothly.

Preferably, each blade is set aslant relative to the plane where the fixed base is located.

In the solutions above, the rotation of the moveable blade and the screw rod may be driven by an electric mechanism, e.g. a transmission mechanism comprising a motor matched with a drive gear group, or a manual component configured on the casing and controlled by hand to drive and connect to the moveable blade and the screw rod. The manual component may have various structures. Preferably, the upper portion of the casing may be provided with a hollow rotating base connected to the casing and be able to rotate relative to the casing. The hollow rotating base is provided with a rotating shaft interlocked with the hollow rotating base. The rotating shaft drives the fixed base and the screw rod and is connected to them.

In order to discharge the ground spices conveniently and increase the mutual cutting force with the moveable blade, the fixed blade may comprise a flat plate located opposite to the casing with a plurality of holes for ground powder pass through. The fixed blade in this structure divides the inner cavity of the casing into a feeding and grinding area at the lower portion and a discharging area at the upper portion, which is more simple and rational.

Preferably, the holes are provided with sharp teeth protruding inwards.

Compared to the prior art, the feeding mechanism design in the present invention provides a solution for feeding spices with large volume and/or relatively smooth spices with small friction in the prior art, so that the grinder provided by the present invention is applicable not only to grinding granular spices, but also grinding leafy spices with large volume and light weight. The screw rod feeding mechanism design in the preferred solution provides a simpler and more rational grinder structure while ensuring smooth conveyance of the spices. And the grinding assembly design with a moveable blade matched with a fixed blade ensures easier grinding of spices with large volume.

DETAILED DESCRIPTION OF THE INVENTION

The present invention will be described in details below in combination with the accompanying drawings of embodiments.

Figure 1:
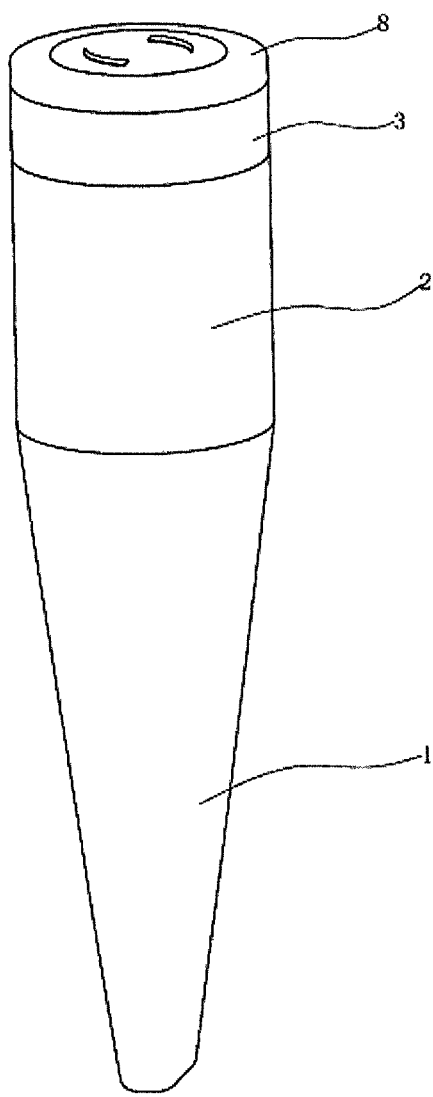
FIG. 1 is a schematic isometric view illustrating the structure of an embodiment of the practical model.
Figure 2:
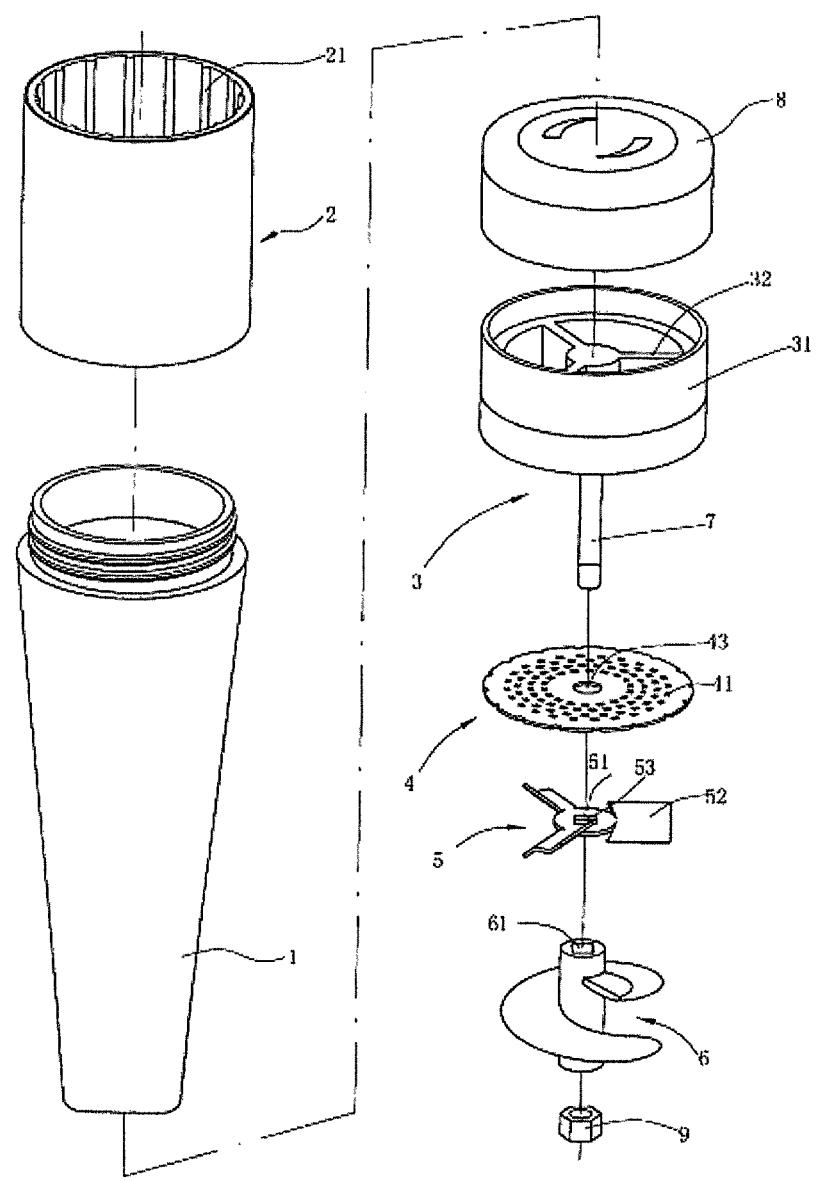
FIG. 2 is a three-dimensional exploded view of an embodiment of the practical model.
Figure 3:
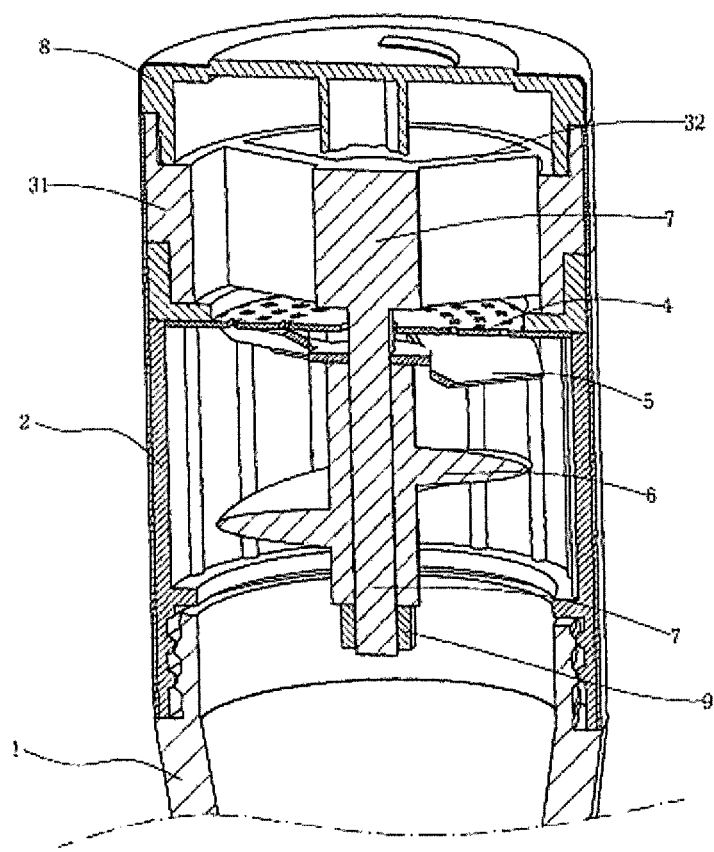
FIG. 3 is a local sectional view of an embodiment of the practical model.

As shown in FIG. 1 to FIG. 3, the grinder comprises:

A container bottle 1 for containing spices, and in threaded to the lower portion of Casing 2;

A casing 2, for forming a cavity for accommodating and installing a grinding assembly, and the inner peripheral wall of the casing is provided with a plurality of bumps 21 shaped as long strips and spaced apart with each other. These bumps are configured parallel with each other;

A hollow rotating base 3, configured above the casing 2, comprises a rotating ring 31 connected to the casing 2 and a plurality of ribs 32 set spaced on the rotating ring and protruding towards the centre of the rotating ring 31. These ribs 32 are arranged uniformly along the perimeter of the rotating ring and spaced with each other to discharge the ground spices. The rotating ring 31 and the casing are connected by matched steps so that the rotating ring 31 can rotate. An end cover 8 is provided on top of the hollow rotating base;

A fixed blade 4, structured as a round flat plate, is matched with the cavity of the casing and provided with a plurality of through holes 41. The inner peripheral walls of the holes in the present embodiment are provided with sharp teeth protruding inwards. The center portion of the fixed blade 4 is provided with a shaft hole 43;

A moveable blade 5 located below the fixed blade 4 comprises a fixed base 51 and a plurality of blades 52 configured on the periphery of the fixed base. There are three blades in the present embodiment. The blades 52 are arranged uniformly along the perimeter of the fixed base. Each blade is set aslant relative to the plane where the fixed base is located. The center portion of the fixed base 51 is provided with a shaft hole 53;

A screw rod 6, also called a packing auger, is located between the container bottle 1 and the moveable blade 5, and the center portion of the screw rod is provided with a shaft hole 61;

A rotating shaft 7, one end is fixed with each convex rib 32 and the other end is extended downwards to pass through the shaft hole 43 on the fixed blade and the shaft hole 53 on the moveable blade and finally running out of the shaft hole 61 on the screw rod, respectively. The rotating shaft 7 and the screw rod 6 are fixed together by a nut 9. The rotating shaft 7 loose fits with the shaft hole on the fixed blade. In other words, the fixed blade 4 will not rotate with the rotation of the rotating shaft, while the shaft hole on the moveable blade fits with the rotating shaft more tightly so that the moveable blade will rotate with the rotation of the rotating shaft 7.

Taking chili grinding for example, toppled the grinder, and the dry chilies in their original structure in the container bottle 1 falls into the inner cavity of the casing. Without any action, the dry chilies, which are relatively large in volume with smooth surface, substantially block at the junction between the container bottle 1 and the casing, and fail to reach to the moveable blade 5 and the fixed blade 4.

The rotating ring 31 is rotated so that the convex ribs 32 drive the rotating shaft 7 to rotate so as to drive the moveable blade 5 and the screw rod 6 to rotate. The blocked dry chilies are conveyed to the moveable blade 5 by the rotation of the screw rod 6 and crushed preliminarily with the stirring and cutting of the moveable blade 5. The preliminarily crushed chili blocks enter the space between the moveable blade 5 and the fixed blade 4 and are further ground by the friction between the moveable blade 5 and the fixed blade 4. At the same time, the crushed chili pieces entering the material holes 41 of the fixed blade 4 are ground into sizes which are smaller than those of the materials holes 41 under the combined action of the fixed blade 5 and the sharp teeth in the material holes, and then flow out of the material holes 41 to be discharged from the intervals between the convex ribs 32.

The invention claimed is:

1. A grinder, comprises a container bottle (1) for containing a spice, a grinding assembly interconnected with the container bottle (1) and used for grinding the spice and a casing (2) for accommodating the grinding assembly, wherein a feeding mechanism for pushing the spice from the container bottle (1) into the grinding assembly is further provided between the container bottle (1) and the grinding assembly in the casing (2), the grinding assembly having a fixed blade comprising a flat plate located relative to the casing (2), the flat plat having a plurality of holes (41) provided on the flat plate, each hole (41) having sharp teeth on an inner peripheral walls, and a moveable blade (5), which is matched with the fixed blade (4) to cut and grind the spice.

2. The grinder according to claim 1, wherein the feeding mechanism is a screw rod (6) provided between the container bottle (1) and the grinding assembly and driven by external force to rotate.

3. The grinder according to claim 2, wherein a plurality of bumps (21) protruding towards the screw rod (6) are provided on the inner peripheral walls of the casing (2) facing the screw rod (6) to increase the friction between the spice and the inner wall of the casing when the screw rod feeds the spice so that feeding is more smooth.

4. The grinder according to claim 3, wherein the bumps (21) are shaped as strips and these bumps (21) are arranged in parallel to the axial axis of the screw rod (6).

5. The grinder according to claim 1, wherein the moveable blade (5) is driven by external force to rotate.

6. The grinder according to claim 5, wherein the moveable blade (5) comprises a fixed base (51) driven by external force to rotate and a plurality of blades (52) connected to the periphery of the fixed base (51); the blades (52) are arranged uniformly along the periphery of the fixed base (51).

7. The grinder according to claim 6, wherein the upper portion of the casing is provided with a rotating base (3) connected to the casing (2) and capable of rotating relative to the casing (2); the hollow rotating base (3) is provided with a rotating shaft (7) interlocked with the hollow rotating base (3); the rotating shaft (7) drives and connects the fixed base (51) and the screw rod (6).

8. The grinder according to claim 6, wherein each blade (52) is set aslant relative to the plane where the fixed base (51) is located.

* * * * *